(12) United States Patent
Huang

(10) Patent No.: US 8,827,186 B2
(45) Date of Patent: Sep. 9, 2014

(54) PRESSURE BOOSTING SHOWERHEAD

(76) Inventor: So-Mei Huang, Tai Ping (TW)

( * ) Notice: Subject to any disclaimer, the term of this patent is extended or adjusted under 35 U.S.C. 154(b) by 624 days.

(21) Appl. No.: 13/137,008

(22) Filed: Jul. 14, 2011

(65) Prior Publication Data

US 2013/0015268 A1  Jan. 17, 2013

(51) Int. Cl.
*E03C 1/08* (2006.01)
*B05B 1/18* (2006.01)
*B05B 7/04* (2006.01)
*E03C 1/084* (2006.01)
*E03C 1/04* (2006.01)

(52) U.S. Cl.
CPC ............... *B05B 1/18* (2013.01); *B05B 7/0441* (2013.01); *E03C 1/084* (2013.01); *E03C 2001/082* (2013.01); *E03C 1/0408* (2013.01); *B05B 7/0425* (2013.01)
USPC ...................... 239/428.5; 239/587.4; 239/567

(58) Field of Classification Search
CPC ...... B05B 7/0416; B05B 7/0425; B05B 1/18; E03C 1/084; E03C 2001/082; E03C 1/0408
USPC ............................ 239/428.5, 548, 567, 587.4
See application file for complete search history.

(56) References Cited

U.S. PATENT DOCUMENTS

| | | | | |
|---|---|---|---|---|
| 4,322,292 A * | 3/1982 | Knox | ......................... | 239/428.5 |
| 4,346,844 A * | 8/1982 | Harmony | ...................... | 239/381 |
| 4,573,639 A * | 3/1986 | Logue | ......................... | 239/428.5 |
| 5,111,994 A * | 5/1992 | Gonzalez | .................. | 239/428.5 |
| 5,154,355 A * | 10/1992 | Gonzalez | .................. | 239/428.5 |
| 6,343,750 B1 * | 2/2002 | Engel | ............................ | 239/463 |
| 7,611,070 B2 * | 11/2009 | Paoluccio | ........................ | 239/9 |
| 7,975,936 B2 * | 7/2011 | Paoluccio | ........................ | 239/9 |
| 2013/0248621 A1 * | 9/2013 | Huang | ........................ | 239/428.5 |

* cited by examiner

Primary Examiner — Jason Boeckmann
(74) Attorney, Agent, or Firm — Guice Patents PLLC

(57) ABSTRACT

The present invention relates to a pressure boosting showerhead, which consists of a housing, a ball shape connector, a rear holder, an inner holder, a separation header and an water outflow dish. Wherein, a bending second air passage and a second inlet chamber are set between the inner barrel of the rear holder and the cone tip of the inner holder. The second inlet chamber is communicated with the first inlet chamber in the housing. The second inlet chamber is communicated with the mixed chamber of the inner holder through the second air passage, to prevent water flow reversely penetrating into the air circulation path and boost pressure to maintain the water outflow of the showerhead with better impact strength to thereby achieve the purpose of saving water.

4 Claims, 6 Drawing Sheets

PRESSURE BOOSTING SHOWERHEAD

BACKGROUND OF THE INVENTION

1. Field of the Invention

The present invention relates to a pressure boosting showerhead, and more particularly to a pressure boosting showerhead for preventing water flow reversely penetrating into the air circulation path and boosting pressure to maintain the water outflow of the showerhead with better impact strength to thereby achieve the purpose of saving water.

2. Brief Description of the Related Art

For the purpose of saving water, a conventional showerhead usually uses the structure of mixing air into water outflow to increase the impact strength of water outflow, such as U.S. Pat. No. 5,111,994 (the structure is shown in FIG. 1), U.S. Pat. No. 7,611.070 (the structure is shown in FIG. 2). The prior arts all have a common point that leading into outside air via air inlets 11, 21, sending out air via air outlets 12, 22 to mix with water outflow and boost pressure for spraying. Basically, these kinds of method are all used to increase the impact strength of water outflow, namely, using less water to let the user feel the effect of water outflow impacting. However, the abovementioned structure has a defect in using. Outside air gets into the showerhead due to leading of water outflow. But air outlets 12, 22 are not designed as watertight. Part of the strong water flow may reversely infiltrate into air outlets 12, 22 and may obstruct outlet and interference the mixing air amount, pressure of the mixing water flow may be reduced and the impact strength of water outflow may become weaker. So the user may feel that the water outflow amount is not enough, and increase the water outflow amount to look for water outflow with larger impact strength. Thus, the amount of using water is increased and the purpose of saving water can not be achieved.

SUMMARY OF THE INVENTION

In order to overcome the deficiencies of the conventional showerhead, after a plurality of improvements, the inventor finally completes the pressure boosting showerhead of the present invention. The primary object of the present invention is to provide a pressure boosting showerhead for preventing water flow reversely penetrating into the air circulation path, to thereby boost pressure for maintaining the water outflow of the showerhead having better impact strength, to save water.

With the above object in mind, the present invention is consisted of a housing, a ball shape connector, a rear holder, an inner holder, a separation header and an water outflow dish. A bending second and a second inlet chamber are set between the inner barrel of the rear holder and the cone tip of the inner holder. An outlet waterway inside the inner barrel is communicated with an water inlet of the cone tip to mix and air and water outflow, boost pressure and send into the mixed chamber, flow out from a water outlet and spray out from spray holes, to thereby save water and prevent water flow reversely penetrating into the air circulation path and boost pressure to maintain the water outflow of the showerhead with better impact strength.

The said rear holder of the present invention, a first end part is set on the inner barrel of the inlet cylinder. The first end part is composed of a first peripheral edge extended connecting to a cone end edge, and is corresponding to a second end part set on the cone tip part. The second end part, which is composed of a second peripheral and to a cone hole edge, forms the second air passage between the first and second end parts. And the aperture of the outlet waterway of the inner barrel is smaller than the aperture of the water inlet of the cone tip part, the position of the water outflow is lower than the position of air inlet, so as to prevent water outflow infiltrating, interfering and obstructing of the air flowing out from the second air passage, to thereby overcome the deficiencies of the conventional showerhead.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
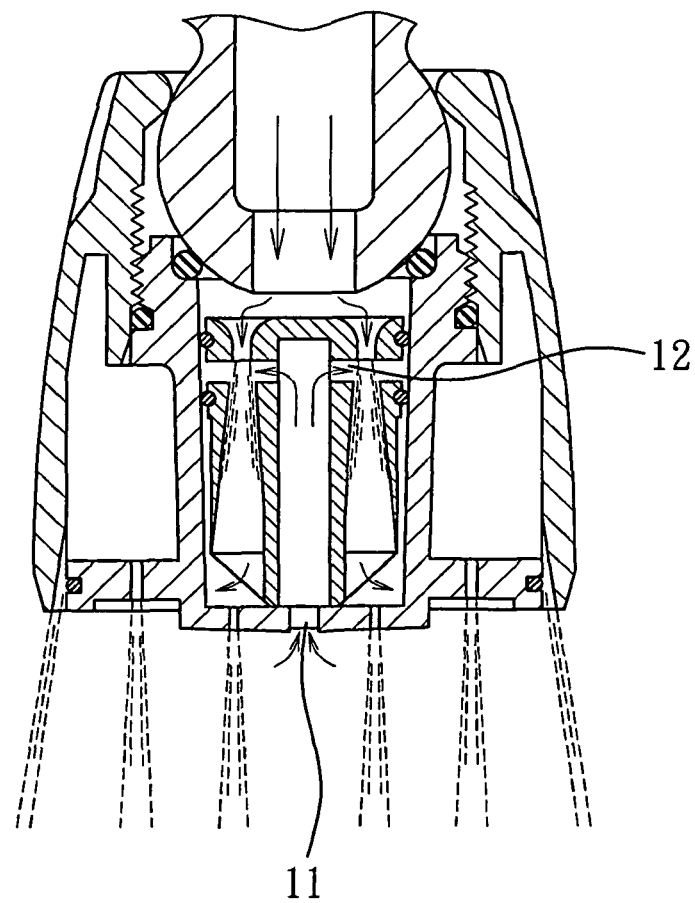
FIG. 1 is a sectional action diagram of a conventional showerhead.
Figure 2:
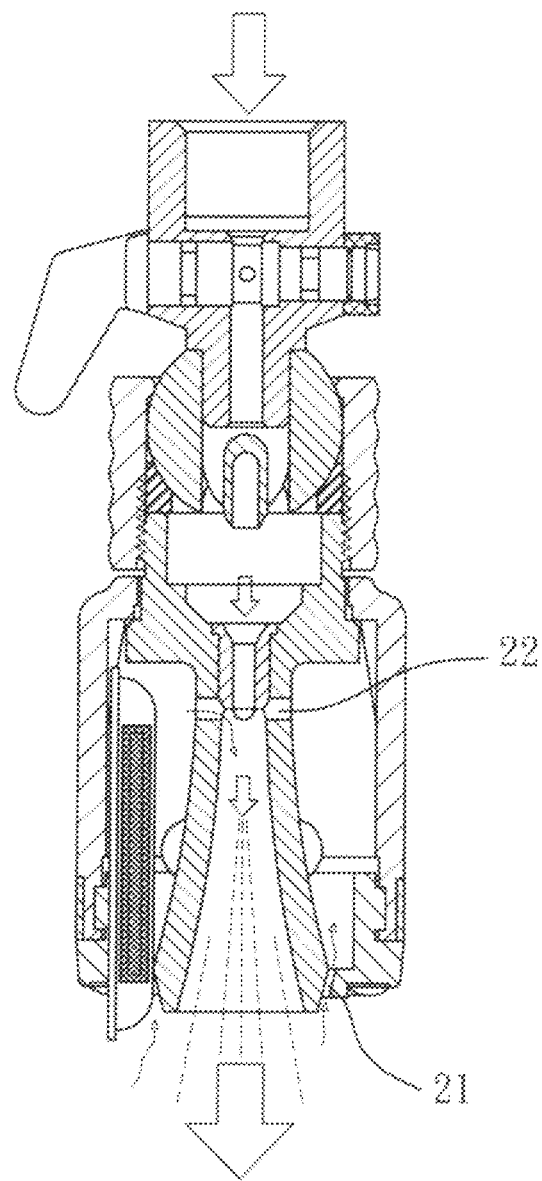
FIG. 2 is a sectional action diagram of another conventional showerhead.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 3:
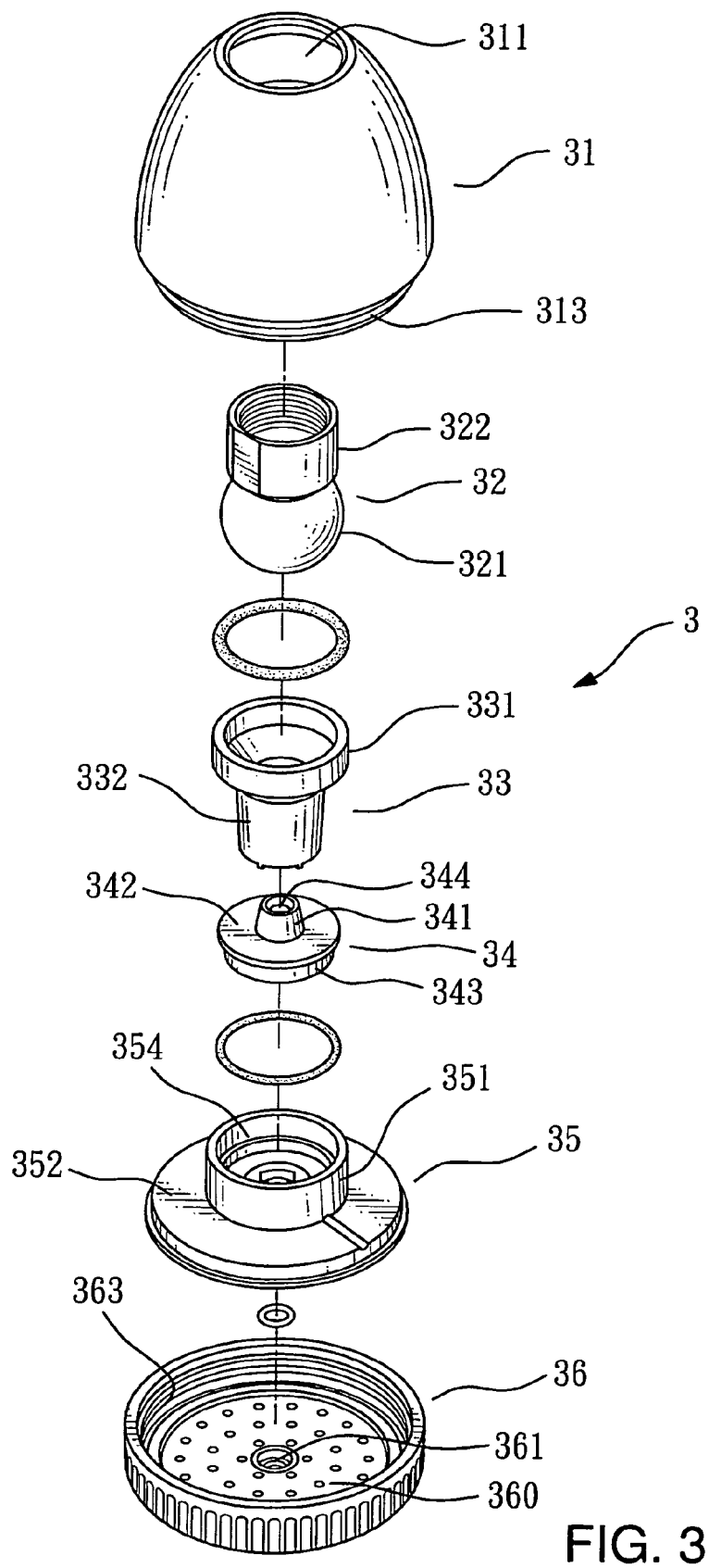
FIG. 3 is a three-dimensional exploded view according to the present invention.
Figure 4:
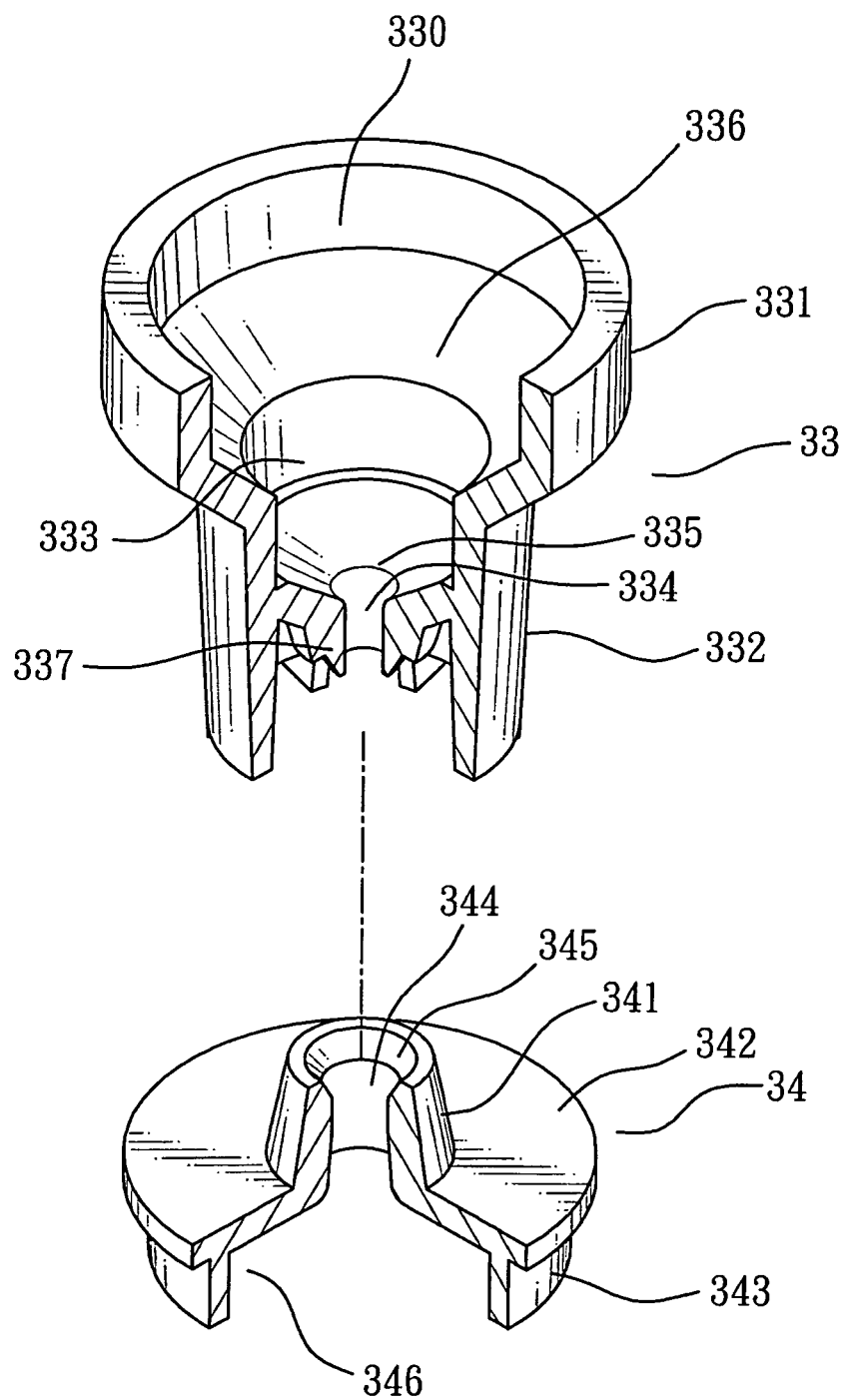
FIG. 4 is a partial three-dimensional exploded sectional view according to the present invention.
Figure 6:
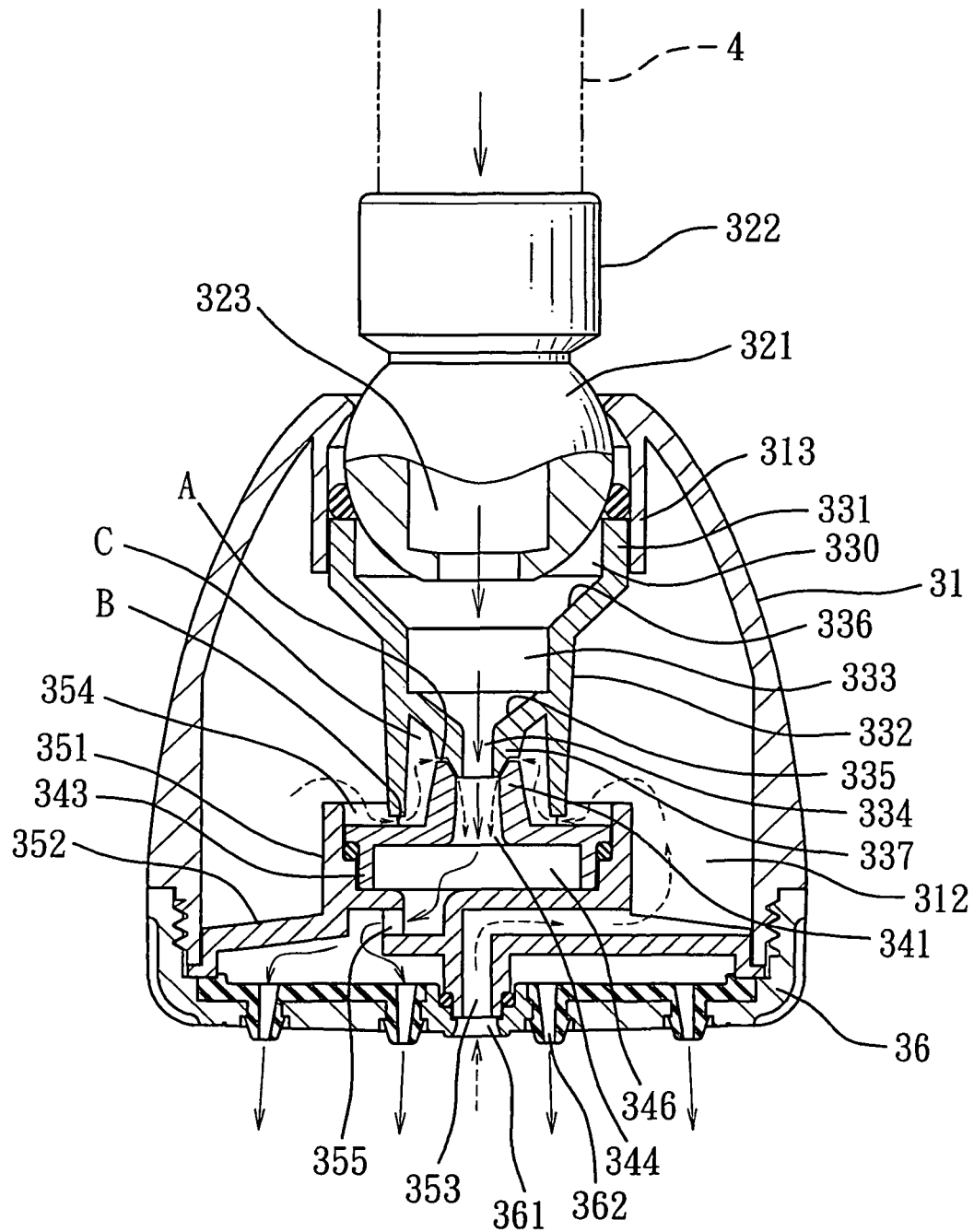
FIG. 6 is an action diagram according to the present invention.

With reference to FIGS. 3 and 6, the pressure boosting showerhead 3 of the present invention is consisted of a housing 31, a ball shape connector 32, a rear holder 33, an inner holder 34, a separation header 35 and an water outflow dish 36, wherein:

the housing 31 is a hollow shell with an outer thread 313 set on the front peripheral edge and a connector capacity 311 set on the rear end;

the ball shape connector 32 with a ball shape part 321 set on the front side locating in the connector capacity 311, and an assembling part 322 set on the rear side for connecting a water hose 4;

the rear holder 33 with an inlet cylinder 332 set on the front side and a joint part 331 set on the rear side, a joint capacity 330 is located inside the joint part 331 for the ball shape part 321 of the ball shape connector 32 jointing to engage, and an inner barrel 337 is set inside the inlet cylinder 332 of the rear holder 33;

the inner holder 34 with a front cylinder 343 (please refer to FIG. 4) set on the front side, a mixed chamber 346 formed inside, and a platform 342 set on the rear side of the front cylinder 343 for the front edge of the inlet cylinder 332 of the rear holder 33 leaning on, the center of the platform 342 extrudes a cone tip part 341, a water inlet 344 is set through the center of the cone tip part 341 and communicated with the mixed chamber 346;

the separation header 35 with a chassis 352, a sleeve 351 is convex set in the center of the chassis 352, an inner room 354 is set inside the sleeve 351 for the front cylinder 343 of the inner holder 34 setting in, and an inlet airway 353 is set on the center of the chassis 352, the inlet airway 353 is bending and extending outward, an water outlet hole 355 is set on the bottom edge of the inner room 354;

the water outflow dish 36 with an inner thread 363 around the inner edge for screwing with the outer thread 313 of the housing 31, a middle hole 361 is set in the center of the side 360 of the water outflow dish 36, and multiple spray holes 362 are distributed on the side 360.

The characteristic of the present invention is that a bending second air passage A and a second inlet chamber C are set between the inner barrel 337 of the inlet cylinder 332 and the cone tip part 341 of the inner holder 34. An outlet waterway 334 in the inner barrel 337 is communicated with a water inlet 344 of the cone tip part 341, to mix air and water outflow, boost pressure and send into the mixed chamber 346, flow out from a water outlet 355 and spray out from spray holes 362.

Figure 5:
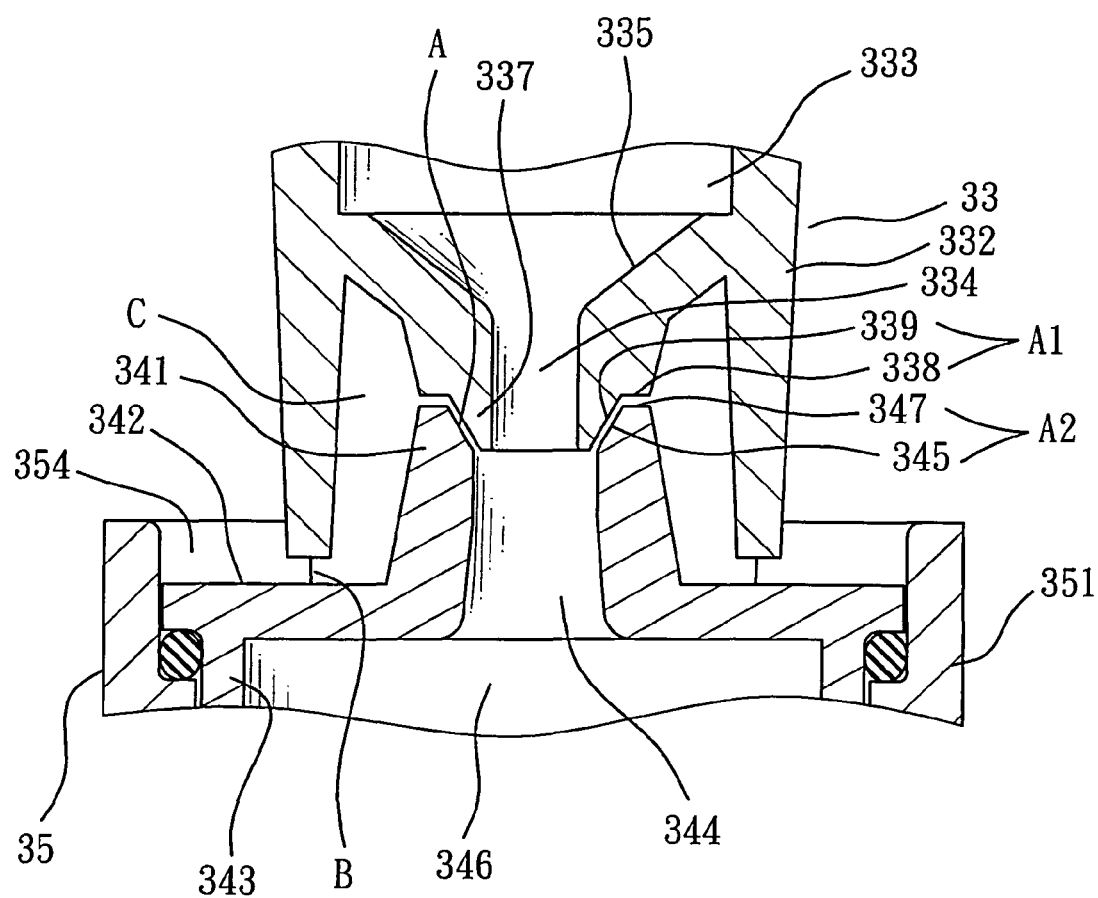
FIG. 5 is a partial detail sectional view according to the present invention.

As shown in FIG. 5, a first end part A1, which is set on the inner barrel 337 of the inlet cylinder 332 of the present invention, is composed of a first peripheral edge 338 extended connecting to a cone end edge 339. The first end part A1 is corresponding to a second end part A2 set on the cone tip part 341. The second end part A2 is composed of a second peripheral edge 347 and a cone hole edge 345, and the gap in between forms the second air passage A. The aperture of the outlet waterway 334 of the inner barrel 337 is smaller than the aperture of the water inlet 344 of the cone tip part 341, then the position of the water outflow is lower than the position of air inlet, so as to prevent water outflow infiltrating, interfering and obstructing of the air flowing out from the second air passage A. The second air passage A is communicated with the second inlet chamber C, and the second inlet chamber C is communicated with the first inlet chamber 312 in the housing 31 through a first air passage B.

As shown in FIG. 6, when showering, the water outflow enters the showerhead 3 from the water hose 4, and enters the tapered hole 336, the inlet chamber 333, the oblique cone hole 335 and the outlet waterway 334 of the rear holder 33 via the hole 323 of the ball shape connector 32, and enters the water inlet 344. Due to the drainage function of water flowing, the outside air enters the inlet airway 353, the first inlet chamber 312, the air passage B, the second inlet chamber C, the air passage A from the middle hole 361, and then enters the water inlet 344 mixing with water, and enters the mixed chamber 346. By the time, since the booster effect of mixing air and water, the water may have larger impact strength when spraying from the spray holes 362. Thus, users may feel large amount of water. The showerhead of the present invention is provided for boosting pressure to maintain the water outflow having better impact strength without using large amount of water, to thereby achieve the purpose of saving water.

While the invention has been described with reference to a preferred embodiment thereof, it is to be understood that modifications or variations may be easily made without departing from the spirit of this invention, which is defined in the appended claims.

I claim:

1. A showerhead for use with a water hose, the showerhead comprising: a housing, a ball shape connector, a rear holder, an inner holder, a separation header and an water outflow dish, wherein:

the housing is a hollow shell having a connector capacity located on a rear end thereof;

the ball shape connector having a ball shape part located on a front side of the ball shape connector and being located in the connector capacity, and an assembling part located on a rear side of the ball shape connector for connecting to the water hose;

the rear holder having an inlet cylinder located on a front side of the rear holder and a joint part located on a rear side of the rear holder, a joint capacity is located inside the joint part, the ball shape part of the ball shape connector is located in the joint capacity, and an inner barrel is located inside the inlet cylinder of the rear holder;

the inner holder having a front cylinder located on a front side thereof, a mixed chamber formed inside the front cylinder, and a platform located on a rear side of the inner holder, the front edge of the inlet cylinder of the rear holder is located adjacent to the platform of the inner holder, the inner holder has a cone tip part protruding rearwardly from a center of the platform, a water inlet is located through a center of the cone tip part and communicating with the mixed chamber;

the separation header having a chassis, a sleeve is a convex located in a center of the chassis, an inner room is located inside the sleeve, the front cylinder of the inner holder is located in the inner room, and an inlet airway is located through a center of the chassis, the inlet airway is bending and extending outwardly from the center of the chassis, an water outlet hole is located on a bottom edge of the inner room;

the water outflow dish having an inner thread located around an inner edge for screwing with an outer thread of the housing, a middle hole is located in a center of a side of the water outflow dish, and multiple spray holes are distributed on the side of the water outflow dish; and a bending second air passage and a second inlet chamber are located between the inner barrel located inside the inlet cylinder of the rear holder and the cone tip part of the inner holder, an outlet waterway is located through the inner barrel and communicating with the water inlet of the cone tip part, air from the bending second air passage and the second inlet chamber is mixed with water from the outlet waterway in the mixed chamber and an air and water outflow flows out of the mixed chamber through the water outlet of the separation header and spraying out from the multiple spray holes of the water outflow dish.

2. The showerhead according to claim 1, wherein the inlet cylinder of the rear holder has a first end part located on the inner barrel of the inlet cylinder, the first end part is composed of a first peripheral edge extending from and connecting to a cone end edge.

3. The showerhead according to claim 1, wherein the inner holder has a second end part located on the cone tip part of the inner holder, the second end part is composed of a second peripheral edge and a cone hole edge.

4. The showerhead according to claim 1, wherein an aperture of the outlet waterway of the inner barrel is smaller than an aperture of the water inlet of the cone tip part.

* * * * *